United States Patent
Aoyagi (10) Patent No.: US 8,857,201 B2
(45) Date of Patent: Oct. 14, 2014

(54) AIR-CONDITIONING DEVICE FOR VEHICLE

(75) Inventor: Takeshi Aoyagi, Toyota (JP)

(73) Assignee: Denso Corporation, Kariya (JP)

( * ) Notice: Subject to any disclaimer, the term of this patent is extended or adjusted under 35 U.S.C. 154(b) by 690 days.

(21) Appl. No.: 12/872,684

(22) Filed: Aug. 31, 2010

(65) Prior Publication Data

US 2011/0048044 A1   Mar. 3, 2011

(30) Foreign Application Priority Data

Sep. 2, 2009 (JP) ................................ 2009-202702

(51) Int. Cl.
  *F25B 1/00* (2006.01)
  *F25B 49/00* (2006.01)
  *B60H 1/00* (2006.01)

(52) U.S. Cl.
  CPC ........ *B60H 1/00764* (2013.01); *B60H 1/00878* (2013.01)
  USPC .............. 62/230; 62/226; 62/228.1; 62/228.4

(58) Field of Classification Search
  USPC ................ 62/215, 230, 133, 134, 226, 228.1, 62/228.4
  See application file for complete search history.

(56) References Cited

U.S. PATENT DOCUMENTS

| | | | |
|---|---|---|---|
| 3,088,656 A | 5/1963 | Hartley | |
| 5,765,383 A * | 6/1998 | Inoue | 62/209 |
| 6,230,496 B1 | 5/2001 | Hofmann et al. | |
| 6,330,909 B1 * | 12/2001 | Takahashi et al. | 165/202 |
| 6,688,120 B2 | 2/2004 | Aoki et al. | |
| 6,725,681 B2 | 4/2004 | Adaniya et al. | |
| 6,729,148 B2 | 5/2004 | Wakisaka et al. | |
| 6,820,436 B2 | 11/2004 | Tomita et al. | |
| 6,986,645 B2 * | 1/2006 | Iwanami et al. | 417/16 |
| 7,100,383 B2 | 9/2006 | Sugesawa et al. | |
| 8,073,605 B2 | 12/2011 | Naik et al. | |
| 2002/0020176 A1 * | 2/2002 | Kimura et al. | 62/133 |
| 2002/0069656 A1 | 6/2002 | Niimi | |
| 2002/0134093 A1 | 9/2002 | Aoki et al. | |
| 2003/0018415 A1 * | 1/2003 | Sonobe et al. | 700/275 |

(Continued)

FOREIGN PATENT DOCUMENTS

| | | |
|---|---|---|
| EP | 2 014 491 | 1/2009 |
| JP | 59-092211 | 5/1984 |

(Continued)

OTHER PUBLICATIONS

Japanese Official Action dated Dec. 11, 2012 issued in corresponding Japanese Application No. 2009-202702, with English translation.

(Continued)

*Primary Examiner* — Marc Norman
*Assistant Examiner* — Paolo Gonzalez
(74) *Attorney, Agent, or Firm* — Nixon & Vanderhye P.C.

(57) ABSTRACT

An air-conditioning device includes a refrigerating cycle; a controller to control a refrigerant discharge capacity of a compressor of the cycle in a manner that a refrigerant evaporation temperature of an evaporator of the cycle approaches a target temperature; and a setting portion to set an upper limit for a fuel amount consumed by an engine based on at least the refrigerant evaporation temperature. The controller controls the refrigerant discharge capacity of the compressor in a manner that an actual fuel amount consumed by the engine is equal to or lower than the upper limit.

6 Claims, 4 Drawing Sheets

(56) References Cited

U.S. PATENT DOCUMENTS

| | | |
|---|---|---|
| 2003/0097852 A1 | 5/2003 | Tomita et al. |
| 2004/0168449 A1 | 9/2004 | Homan et al. |
| 2006/0204368 A1 | 9/2006 | Imai et al. |
| 2008/0011005 A1 | 1/2008 | Obayashi et al. |
| 2008/0229767 A1* | 9/2008 | Nakamura et al. ............... 62/133 |
| 2008/0288185 A1 | 11/2008 | Sawada et al. |
| 2008/0289347 A1 | 11/2008 | Kadle et al. |
| 2009/0049848 A1 | 2/2009 | Markowitz et al. |

FOREIGN PATENT DOCUMENTS

| | | |
|---|---|---|
| JP | 02-068214 | 3/1990 |
| JP | H4-357446 | 12/1992 |
| JP | 2002-247878 | 8/2002 |
| JP | A-2002-356112 | 12/2002 |
| JP | 2003-175721 | 6/2003 |
| JP | 2005-207321 | 8/2005 |
| JP | 2006-273027 | 10/2006 |
| JP | 2006-298042 | 11/2006 |
| JP | 2009-107605 | 5/2009 |

OTHER PUBLICATIONS

Chinese Office Action dated Aug. 29, 2012, issued in corresponding Chinese Application No. 201010273129.1, with English translation.

Office Action (6 pages) dated Apr. 8, 2013, issued in corresponding Chinese Application No. 201010273129.1 and English translation (3 pages).

Office Action (2 pgs.) dated Jun. 25, 2013 issued in corresponding Japanese Application No. 2009-218971 with an at least partial English-language translation thereof (3 pgs.).

Office Action dated Jun. 7, 2013 issued in co-pending U.S. Appl. No. 12/872,720.

Office Action (2 pages) dated Feb. 5, 2013 issued in corresponding Japanese Application No. 2009-218971 and English translation (4 pages).

Official Action (16 pages) dated Nov. 9, 2012, issued in copending U.S. Appl. No. 12/872,720 of Aoyagi, filed Aug. 31, 2010.

Office Action issued in U.S. Appl. No. 12/872,720 on Jul. 1, 2014.

Office Action issued in Chinese Patent Application No. 201010273129.1 on Aug. 14, 2013 with partial English Language Translation of thereof.

Office Action issued in U.S. Appl. No. 12/872,720 on Oct. 24, 2013.

Office Action issued in Japanese Patent Application No. 2009-218971 on Jan. 7, 2014, submitted with partial English Language Translation.

Search Report and Written Opinion issued in corresponding French Patent Application No. 1056842 on Mar. 4, 2014 with English Language Translation.

* cited by examiner

AIR-CONDITIONING DEVICE FOR VEHICLE

CROSS REFERENCE TO RELATED APPLICATION

This application is based on Japanese Patent Application No. 2009-202702 filed on Sep. 2, 2009, the disclosure of which is incorporated herein by reference in its entirety.

BACKGROUND OF THE INVENTION

1. Field of the Invention

The present invention relates to an air-conditioning device for a vehicle.

2. Description of Related Art

An air-conditioning device for a vehicle has a vapor compression refrigerating cycle, and a compressor of the refrigerating cycle is driven by a driving force output from an internal combustion engine of the vehicle. While the air-conditioning device is active, the driving force of the engine is required to be increased, because additional driving force is necessary for the compressor. Therefore, fuel expense is increased while the air-conditioning device is active.

JP-A-2006-298042 discloses an air-conditioning device for a vehicle. A threshold is set for an accelerator opening based on an actual temperature and a preset temperature of a passenger compartment of the vehicle. When the accelerator opening becomes larger than the threshold, power transmission from an engine to a compressor is blocked. Thus, a load of the engine is lowered so as to improve mileage and acceleration characteristic.

However, an output of the engine cannot be controlled in accordance with an output necessary for driving the compressor, while the output of the engine can be controlled in accordance with an output necessary for driving the vehicle. That is, an engine output necessary for an air-conditioning is changed in accordance with a load of the air-conditioning, not in accordance with the accelerator opening.

Therefore, the engine output necessary for the air-conditioning cannot be controlled in JP-A-2006-298042. That is, a fuel consumption amount cannot be controlled in accordance with the load of the air-conditioning.

For example, even if the load of the air-conditioning is lowered, the fuel consumption amount necessary for the air-conditioning cannot be lowered. In this case, the mileage cannot be improved.

SUMMARY OF THE INVENTION

In view of the foregoing and other problems, it is an object of the present invention to provide an air-conditioning device for a vehicle.

According to a first example of the present invention, an air-conditioning device for a vehicle includes a refrigerating cycle, a controller, and an upper limit setting portion. The refrigerating cycle includes a compressor to compress and discharge refrigerant using a driving force output from an internal combustion engine of the vehicle, and an evaporator to evaporate refrigerant by exchanging heat with air to be sent for a passenger compartment of the vehicle. The controller controls a refrigerant discharge capacity of the compressor in a manner that a refrigerant evaporation temperature of the evaporator approaches a target temperature. The upper limit setting portion sets an upper limit for a fuel amount consumed by the engine using at least the refrigerant evaporation temperature. The controller controls the refrigerant discharge capacity of the compressor in a manner that an actual fuel amount consumed by the engine is equal to or lower than the upper limit.

Accordingly, the fuel consumption amount can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

An air-conditioning device 1 is used for cooling a passenger compartment of a vehicle, in an embodiment. The vehicle obtains drive force from an internal combustion engine 10, and gasoline is used as a fuel of the engine 10. A predetermined amount of gasoline is injected to air taken into the engine 10 by a fuel injection valve (not shown) corresponding to an injector. Air-fuel mixture is formed to have a predetermined air-fuel ratio, and the air-fuel mixture is combusted in a combustion chamber of the engine 10. Thus, rotating drive force can be output from the engine 10.

The fuel injection valve includes a valve member and an electromagnetic valve such as coil to displace the valve member. The valve member opens/closes an injection port to inject compressed fuel. The fuel injection valve is controlled by a control voltage output from an engine controller 50 to be described below. The engine controller 50 controls a fuel injection amount by changing a charge time. The injection port is opened during the charge time.

The rotating drive force output from the engine 10 is used not only for driving the vehicle but also for driving a compressor 21. A vapor compression refrigerating cycle 20 of the air-conditioning device 1 cools air to be sent into the passenger compartment, and includes the compressor 21.

Figure 1:
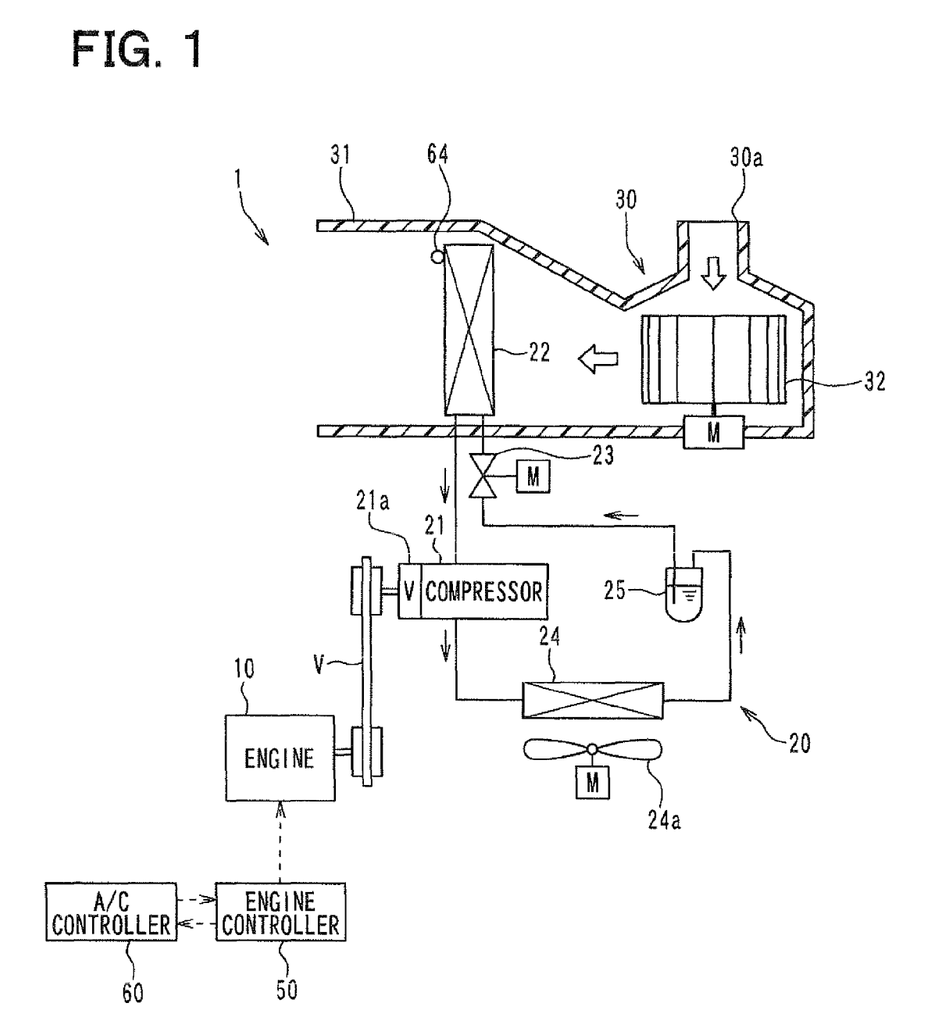
FIG. 1 is a schematic view illustrating an air-conditioning device for a vehicle according to an embodiment.

The air-conditioning device 1 having the refrigerating cycle 20 will be described with reference to FIG. 1.

The refrigerating cycle 20 has the compressor 21, a radiator 24, an electric expansion valve 23, and an evaporator 22. The compressor 21 draws and compresses refrigerant. The radiator 24 makes the compressed refrigerant to emit heat. The expansion valve 23 decompresses and expands high-pressure refrigerant flowing out of the radiator 24. The evaporator 22 makes the expanded refrigerant to evaporate by exchanging heat with air to be sent.

A chlorofluorocarbon refrigerant is used as refrigerant of the refrigerating cycle 20, and a sub-critical refrigerating cycle is constructed. High-pressure side refrigerant pressure does not exceed a critical pressure of the refrigerant. Further, refrigerator oil is mixed into refrigerant for lubricating the compressor 21, and circulates in the cycle with refrigerant.

The compressor 21 is arranged in an engine compartment of the vehicle. The compressor 21 draws refrigerant of the refrigerating cycle 20, and discharges refrigerant after compression. A drive force is transmitted from the engine 10 to the compressor 21 through pulley and belt V. For example, a known swash plate capacity-variable compressor is used as the compressor 21. A discharge capacity of the compressor 21 is continuously controlled by a signal of control current In output from an air-conditioning controller 60.

A refrigerant discharge capacity of the compressor 21 is controlled by changing a refrigerant discharge volume. Specifically, an opening of an electromagnetic control valve 21a of the compressor 21 is changed in accordance with the control current In. A ratio of refrigerant drawn into a swash plate chamber (not shown) inside of the compressor 21 is controlled relative to refrigerant discharged out of the compressor 21. Thus, a piston stroke is controlled by changing an inclined angle of swash plate.

That is, the control valve 21a corresponds to a discharge capacity changing portion to change the refrigerant discharge capacity of the compressor 21. The discharge volume is a geometric volume of operating space in which drawing and compression are performed. Specifically, the discharge volume corresponds to a cylinder volume defined between a top dead center and a bottom dead center of the piston stroke.

The discharge volume of the swash plate compressor can be continuously changed in a range between about 0% and 100%. The compressor 21 is substantially stopped by reducing the discharge volume into about 0%. The compressor 21 has clutch-less construction, thereby the compressor 21 is always connected to the engine 10 through the pulley and belt V.

An outlet of the compressor 21 is connected to an inlet of the radiator 24 in a refrigerant flowing direction. The radiator 24 is arranged at a front side of the engine compartment. Due to the radiator 24, heat is exchanged between high-temperature high-pressure refrigerant flowing out of the compressor 21 and outside air sent from an air-sending fan 24a. A rotation number of the fan 24a is electrically controlled by a control voltage output from the air-conditioning controller 60. Thus, an amount of the air is controlled.

An outlet of the radiator 24 is connected to an inlet of a receiver 25 in the refrigerant flowing direction. The receiver 25 separates refrigerant into gas phase and liquid phase, and stores extra refrigerant. The receiver 25 corresponds to a low-pressure side gas-liquid separator.

An outlet of the receiver 25 is connected to an inlet of the expansion valve 23 in the refrigerant flowing direction. The expansion valve 23 is a decompressing portion to decompress and expand high-pressure refrigerant flowing out of the receiver 25. A throttle passage area of the expansion valve 23 is controlled by a control signal output from the air-conditioning controller 60. The expansion valve 23 is a variable throttle mechanism driven by electricity.

The air-conditioning controller 60 controls the expansion valve 23 in a manner that a superheat degree of refrigerant flowing through an outlet of the evaporator 22 is in a predetermined range. Alternatively, an evaporation sensor may be arranged in place of the expansion valve 23 so as to detect a temperature and a pressure of refrigerant flowing through the outlet of the evaporator 22. The superheat degree of refrigerant flowing through the outlet of the evaporator 22 is calculated based on the temperature and the pressure. The sensor may be arranged on an air side surface of the evaporator 22. The throttle passage area of the expansion valve 23 may be controlled by a temperature-based mechanism in a manner that the superheat degree of refrigerant flowing through the outlet of the evaporator 22 is in the predetermined range.

An outlet of the expansion valve 23 is connected to an inlet of the evaporator 22 in the refrigerant flowing direction. The evaporator 22 is arranged in an air passage defined by an indoor air-conditioning unit 30. Refrigerant flowing through the evaporator 22 exchanges heat with air to be sent, such that the refrigerant is evaporated. The evaporator 22 is a cooling heat exchanger to cool air to be sent using heat-absorbing property.

The outlet of the evaporator 22 is connected to an inlet of the compressor 21 in the refrigerant flowing direction. The evaporator 22 includes plural tubes, header tanks and fins, and refrigerant flows through the tubes. The header tanks are arranged on ends of the tubes in a longitudinal direction of the tubes so as to distribute and gather refrigerant. The fins are arranged between the tubes so as to promote the heat exchange.

The evaporator 22 further includes a coolness storage portion to store cold energy. The coolness storage portion is arranged between the tube and the fin located adjacent to each other. The coolness storage portion includes a container arranged between the tube and the fin, and the container accommodates coolness storage agent such as paraffin.

When refrigerant is evaporated by the evaporator 22, the coolness storage agent is solidified, such that cold energy is stored. When the coolness storage agent is melted, the stored cold energy is emitted. The coolness storage portion is arranged for not all clearances between the tube and the fin. That is, the coolness storage portion may be arranged in some of the clearances.

The indoor air-conditioning unit 30 will be described. The indoor air-conditioning unit 30 is arranged inside of an instrument panel. The panel is located at the most front part of the passenger compartment. A blower 32 and the evaporator 22 are accommodated in a casing 31 of the unit 30.

The casing 31 defines an air passage for air to be sent into the passenger compartment. The casing 31 is made of resin such as polypropylene, for example, having a certain elasticity and an outstanding strength.

An air inlet 30a is defined at the most upstream of the casing 31 in the air flow direction so as to introduce air into the casing 31. An inside-and-outside air change device may be arranged at the inlet 30a. Therefore, air to be introduced into the casing 31 can be switched between inside air and outside air.

The blower 32 is arranged downstream of the inlet 30a in the air flow direction so as to send air drawn through the inlet 30a toward the passenger compartment. The blower 32 may be a centrifugal multi-blade fan such as sirocco fan, and is driven by an electric motor. A rotation number of the blower 32 is controlled by a control voltage output from the air-conditioning controller 60. Thus, an amount of air sent by the blower 32 can be controlled. The evaporator 22 is arranged downstream of the blower 32 in the air flow direction.

Air outlets (not shown) are defined at the most downstream of the casing 31 in the air flow direction so as to blow out air passing through the evaporator 22 into the passenger compartment to be cooled. The air outlets may be constructed by face outlet, foot outlet and defroster outlet. Conditioned air is blown out toward an upper body of an occupant through the face outlet. Conditioned air is blown out toward a foot of an occupant through the foot outlet. Conditioned air is blown out toward an inner face of a windshield of the vehicle through the defroster outlet.

A face door is arranged upstream of the face outlet so as to control an open area of the face outlet. A foot door is arranged upstream of the foot outlet so as to control an open area of the foot outlet. A defroster door is arranged upstream of the defroster outlet so as to control an open area of the defroster outlet. An air outlet mode can be changed by opening or closing the outlets.

Figure 2:
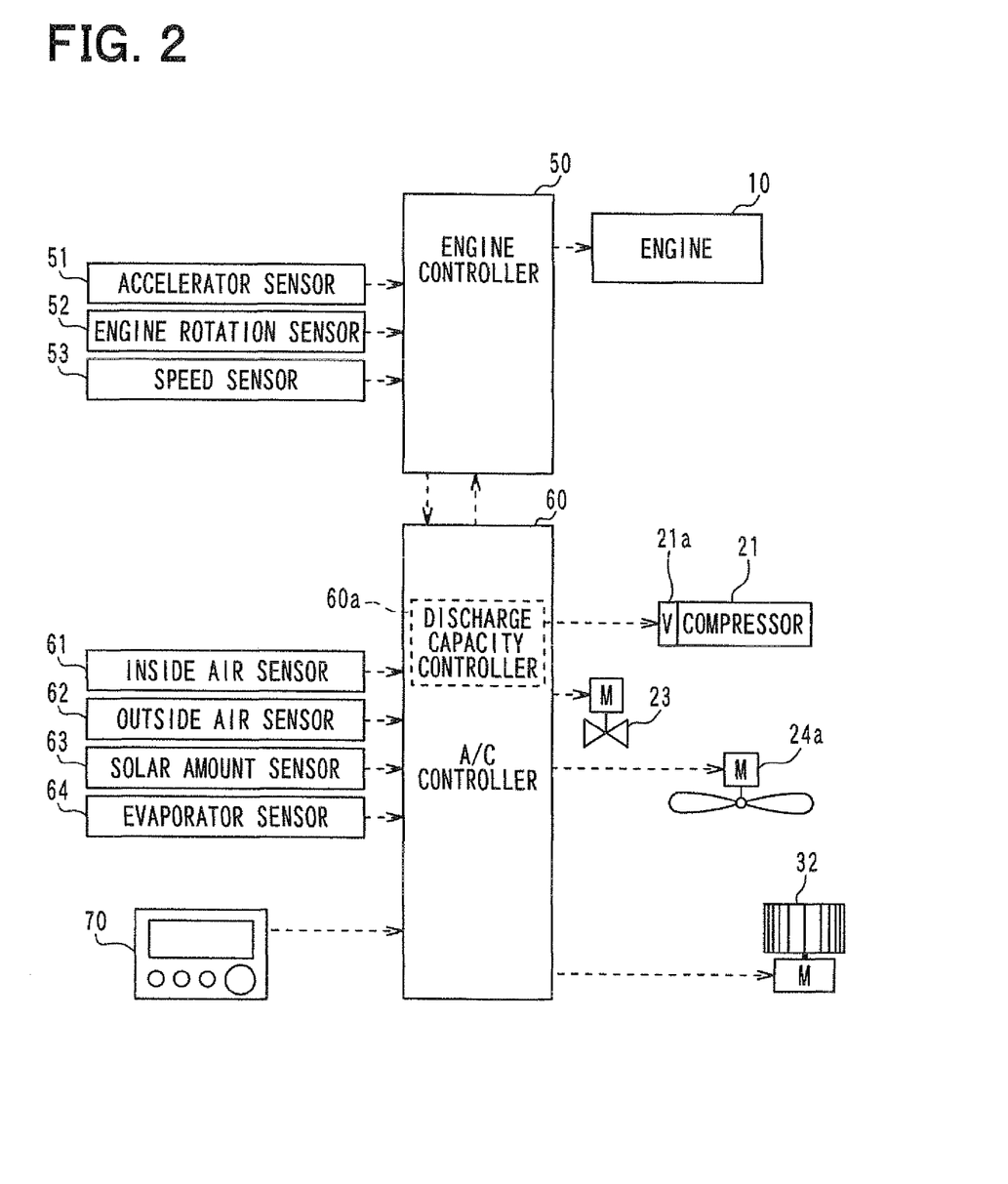
FIG. 2 is a block diagram illustrating the air-conditioning device.

Electric control parts of the air-conditioning device 1 will be described with reference to FIG. 2. Each of the engine controller 50 and the air-conditioning controller 60 includes a microcomputer and a circumference circuit. The microcomputer has CPU, ROM, RAM, etc. Calculation and processing are performed based on control program memorized in the ROM. Various instruments are connected to an output side of the microcomputer, and are controlled by the microcomputer.

Various engine instruments defining the engine 10 are connected to an output side of the engine controller 50. Specifically, a drive circuit of the fuel injection valve, for example, is connected.

Sensors used for controlling the engine 10 are connected to an input side of the engine controller 50. An accelerator opening sensor 51 detects an accelerator opening Acc. An engine rotation number sensor 52 detects an engine rotation number Ne of the engine 10. A speed sensor 53 detects a speed Vv of the vehicle.

The control valve 21*a* of the compressor 21, the expansion valve 23, the air sending fan 24*a*, and the blower 32 are connected to an output side of the air-conditioning controller 60.

Sensors used for controlling air-conditioning are connected to an input side of the air-conditioning controller 60. An inside air sensor 61 detects an air temperature Tr inside of the passenger compartment. An outside air sensor 62 detects an outside air temperature Ta. A solar amount sensor 63 detects a solar radiation amount Ts into the passenger compartment. An evaporator sensor 64 detects an air temperature Te blown out of the evaporator 22. The air temperature Te blown out of the evaporator 22 corresponds to a refrigerant evaporation temperature. The sensor 64 may detect a temperature of air side surface of the evaporator 22.

A console panel 70 is arranged near an instrument board located at a front part of the passenger compartment, and is connected to the input side of the air-conditioning controller 60. Operation signals input into switches of the console panel 70 are output into the air-conditioning controller 60. The switches may be constructed by an activation switch of the air-conditioning device 1, an automatic operation switch of the air-conditioning device 1, a temperature switch for setting a preset temperature Tset for the passenger compartment and an air amount switch for setting an air amount of the blower 32.

While the air-conditioning controller 60 integrally controls the air-conditioning instruments, hardware and software to control the refrigerant discharge capacity of the control valve 21*a* is defined as a discharge capacity controller 60*a*. The refrigerant discharge capacity of the compressor 21 is changed by the control valve 21*a*. The discharge capacity controller 60*a* may be separated from the air-conditioning controller 60.

The engine controller 50 and the air-conditioning controller 60 are electrically connected with each other so as to communicate with each other. When a signal is input into one of the controllers 50, 60, the other of the controllers 50, 60 can control instruments connected to its output side based on the signal. The engine controller 50 and the air-conditioning controller 60 may be integrated with each other.

Figure 3:
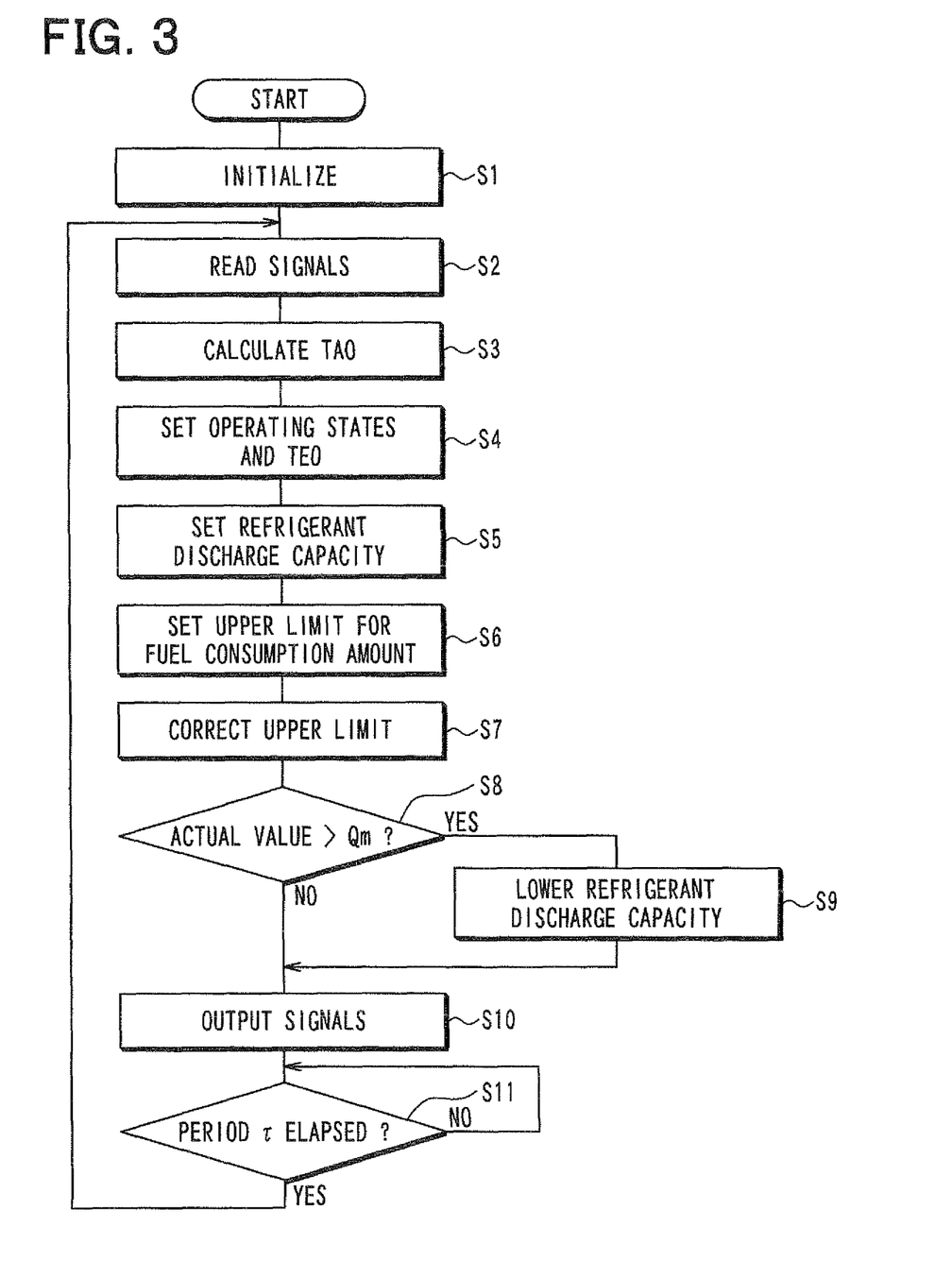
FIG. 3 is a flowchart illustrating a control of the air-conditioning device.

Operations of the air-conditioning device 1 will be described with reference to FIG. 3. FIG. 3 is a flow chart illustrating a control process performed by the air-conditioning controller 60. The control process is started when the automatic operation switch of the console panel 70 is turned on while an ignition switch of the vehicle is active.

At S1, initializations are performed for flag, timer, and control variable. At S2, detection signal of the sensor 61-64, control signal of the engine controller 50, and operation signal of the console panel 70 are read, and S3 is performed.

At S3, a target blow off temperature TAO of air blown into the passenger compartment is computed by using the following expression F1.

$$TAO = Kset \times Tset - Kr \times Tr - Ka \times Ta - Ks \times Ts + C \quad (F1)$$

A value of Tset is a temperature set through the temperature preset switch. A value of Tr is an inside air temperature detected by the inside air sensor 61. A value of Ta is an outside air temperature detected by the outside air sensor 62. A value of Ts is a solar radiation amount detected by the solar sensor 63. Values of Kset, Kr, Ka and Ks are gains, and a value of C is a constant for a correction.

At S4, operating states of the air-conditioning instruments are set, and a target refrigerant evaporation temperature TEO of the evaporator 22 is set.

For example, the air amount of the blower 32 is set based on the target blow off temperature TAO by referring to a control map memorized in the air-conditioning controller 60. Specifically, a voltage applied to the electric motor of the blower 32 is set.

The voltage is raised into the maximum value when a value of TAO is in a very-low-temperature region. Thus, the air amount of the blower 32 is increased into the maximum value so as to perform the maximum cooling operation. As the value of TAO is raised from the very-low-temperature region, the voltage is lowered so as to reduce the air amount.

The target refrigerant evaporation temperature TEO is set based on the target blow off temperature TAO by referring to a control map memorized in the air-conditioning controller 60. Specifically, the value of TEO is increased as the value of TAO is increased. Further, in order to prevent frost formation of the evaporator 22, a lower limit is set for TEO, for example, as 1° C.

At S5, the refrigerant discharge capacity of the compressor 21 is set in a manner that the refrigerant evaporation temperature Te detected by the evaporator temperature sensor 64 becomes equal to the target refrigerant evaporation temperature TEO. Specifically, the control current In supplied to the control valve 21*a* is determined based on a deviation (Te−TEO) between the refrigerant evaporator temperature Te and the target temperature TEO using feedback control such as proportional-plus-integral (PI) control.

At S6 corresponding to an upper limit setting portion, an upper limit Qm is determined for a fuel consumption amount by referring to control signal output from the engine controller 50 and control map memorized in the air-conditioning controller 60. Fuel is consumed in the engine 10 to drive the vehicle and the compressor 21.

The engine controller 50 controls the fuel injection amount by changing an electricity supply time for the fuel injection valve. Further, the engine controller 50 calculates a load of the engine 10 based on detection signals read from the sensor 51-53. Thus, a fuel injection amount necessary for outputting drive force of the vehicle can be set by determining the electricity supply time.

The fuel injection amount necessary for outputting the drive force corresponds to a fuel consumption amount necessary for outputting the drive force. Therefore, the fuel injection amount may be defined as the fuel consumption amount. A fuel consumption amount Qe necessary for driving the vehicle does not include a fuel consumption amount necessary for driving the compressor 21 of the refrigerating cycle 20.

Figure 4:
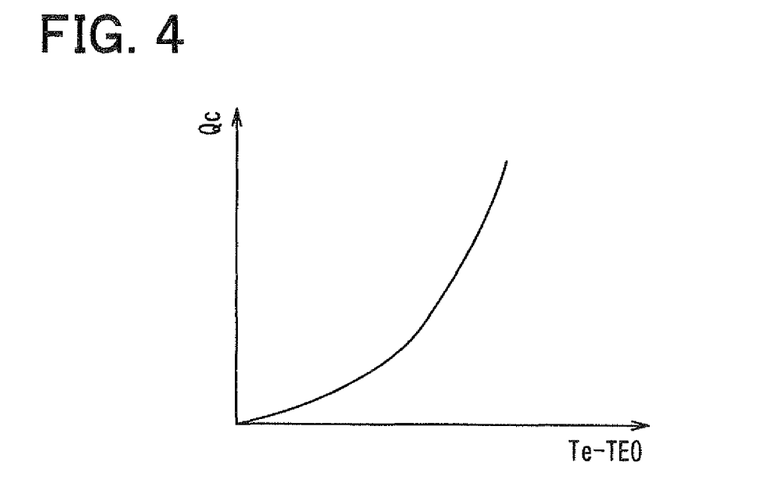
FIG. 4 is a characteristic diagram used for setting an upper limit of a fuel consumption amount.

Therefore, an upper limit Qc is set for a fuel consumption amount used for driving the compressor 21 based on the subtraction value (Te−TEO) by referring to control map memorized in the air-conditioning controller 60. The subtraction value (Te−TEO) is calculated by subtracting the target refrigerant evaporation temperature TEO from the refrigerant evaporation temperature Te. Specifically, as shown in FIG. 4, the upper limit Qc of the fuel consumption amount for driving the compressor 21 is increased, as the subtraction value (Te−TEO) is increased.

In this control map, an increasing degree of the upper limit Qc is increased as the subtraction value (Te−TEO) becomes larger. An upper limit Qm is defined by adding the upper limit Qc for driving the compressor 21 to the upper limit Qe for driving the vehicle based on control signal obtained from the engine controller 50.

At S7 corresponding to an upper limit correcting portion, the upper limit Qm set at S6 is corrected based on the load of the engine 10 by referring to control map memorized in the air-conditioning controller 60.

Figure 5:
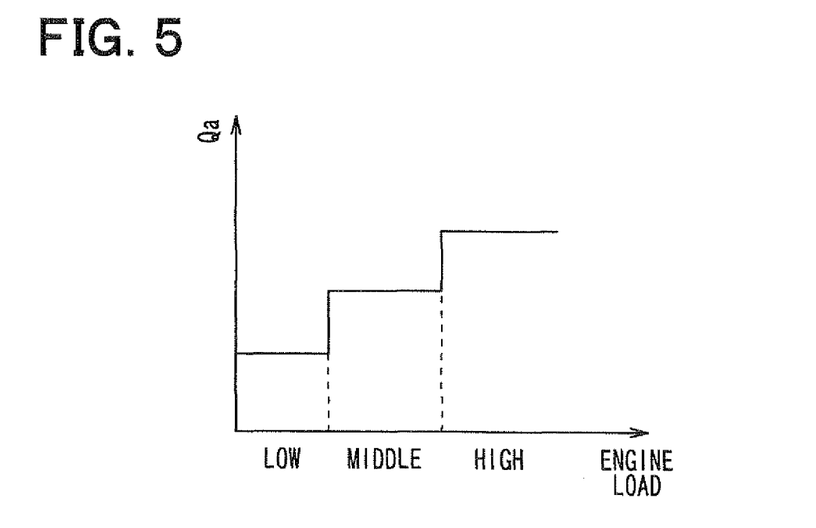
FIG. 5 is a characteristic diagram used for setting a correction amount for the upper limit of the fuel consumption amount.

As shown in FIG. 5, the load of the engine 10 is separated into three levels, such as low, middle and high, for example. A correction amount Qa is increased as the load of the engine 10 is increased. The correction amount Qa is added to the upper limit Qm of S6, so as to define a corrected upper limit Qm for the fuel consumption amount. The load of the engine 10 may be computed by the engine controller 50.

At S8, it is judged whether an actual fuel consumption amount consumed by the engine 10 is larger than the corrected upper limit Qm. Specifically, a fuel consumption amount necessary for realizing the refrigerant discharge capacity of the compressor 21 of S5 is estimated by referring to a predetermined control map based on the subtraction value (Te−TEO).

The estimated fuel consumption amount used for the compressor 21 is added the fuel consumption amount Qe used for driving the vehicle, so as to define an estimation value Qs of the actual fuel consumption amount. When the estimation value Qs is determined to be larger than the upper limit Qm, S9 is performed. When the estimation value Qs is determined to be equal to or smaller than the upper limit Qm, S10 is performed.

The predetermined control map for estimating the fuel amount used for the compressor 21 is defined by subtracting a first fuel consumption amount from a second fuel consumption amount. The first fuel consumption amount is defined when the compressor 21 is stopped. The second fuel consumption amount is defined when the compressor 21 is active.

The value of (Te−TEO) is related with the refrigerant discharge capacity of the compressor 21. Therefore, the control map memorizes a relationship between the value of (Te−TEO) and the above value calculated by subtracting the first fuel consumption amount from the second fuel consumption amount, in advance. Thus, the fuel consumption amount necessary for realizing the refrigerant discharge capacity of the compressor 21 determined at S5 can be estimated.

At S9, the refrigerant discharge capacity of the compressor 21 is lowered in a manner that the actual fuel consumption amount of the engine 10 becomes equal to or lower than the upper limit Qm, and S10 is performed after S9. Specifically, the control current In supplied to the control valve 21a is changed into a value set at S5, in a manner that the actual fuel consumption amount of the engine 10 becomes equal to or lower than the upper limit Qm. The compressor 21 may be substantially stopped by decreasing the discharge volume of the compressor 21 into about 0%.

At S10, control signals are output from the air-conditioning controller 60 to the air-conditioning instruments, so that control state set at S4-S9 is acquired.

At S11, a control period τ is determined to be elapsed or not. After the control period τ is elapsed, S2 is restarted.

According to the embodiment, the refrigerant evaporation temperature Te of the evaporator 22 is controlled to approach the target evaporation temperature TEO. Therefore, air to be sent into the passenger compartment is cooled by the evaporator 22 so as to have a predetermined temperature. Thus, a cooling air-conditioning can be performed for the passenger compartment.

The refrigerant discharge capacity of the compressor 21 is controlled in a manner that the actual fuel consumption amount of the engine 10 becomes equal to or lower than the upper limit Qm. That is, the actual fuel consumption amount of the engine 10 can be prevented from exceeding the upper limit Qm. Thus, the fuel consumption amount of the engine 10 can be reduced, and the fuel mileage of the vehicle can be increased.

At S6 corresponding to the upper limit setting portion, the subtraction value (Te−TEO) is used for setting the upper limit Qm. Therefore, the upper limit Qm can be determined based on an air-conditioning load. The upper limit Qm is defined by adding the minimum fuel consumption amount necessary for driving the compressor 21, that is necessary for the air-conditioning, to the fuel consumption amount necessary for driving the vehicle.

Further, the upper limit Qm is increased as the value of (Te−TEO) is increased at S6. An increasing degree of the upper limit Qc necessary for driving the compressor 21 is increased as the value (Te−TEO) becomes larger. Therefore, the fuel consumption amount used for activating the compressor 21 can be secured even when the air-conditioning load is increased. Further, the refrigerant evaporation temperature Te can be soon made closer to the target refrigerant evaporation temperature TEO. Thus, the air-conditioning of the passenger compartment can be finished in a short time.

The fuel consumption amount of the engine 10 can be reduced in accordance with the air-conditioning load. That is, the mileage can be increased while the air-conditioning of the passenger compartment is performed.

At S7 corresponding to the upper limit correcting portion, the upper limit Qm of the fuel consumption amount is increased in accordance with an increase of the load of the engine 10. Therefore, fuel necessary for the air-conditioning can be secured even if the fuel necessary for driving the vehicle is increased in accordance with an increase of the load of the engine 10.

At S8 corresponding to a determining portion, the estimation value Qs is estimated for the fuel consumption amount necessary for realizing the refrigerant discharge capacity of the compressor 21 set at S5, by subtracting the first fuel consumption amount from the second fuel consumption amount. The first fuel consumption amount is defined when the compressor 21 is stopped. The second fuel consumption amount is defined when the compressor 21 is active.

Therefore, the refrigerant discharge performance of the compressor 21 can be controlled based on the determination result of S8. Thus, the actual fuel consumption amount consumed by the engine 10 can be controlled to be equal to or lower than the upper limit Qm.

Further, the evaporator 22 includes the coolness storage portion. When the actual fuel consumption amount of the engine 10 becomes higher than the upper limit Qm, the refrigerant discharge capacity of the compressor 21 is reduced. At this time, cold energy stored in the coolness storage portion can be used for cooling air to be sent into the passenger compartment. Therefore, even if the refrigerant discharge capacity of the compressor 21 is reduced, the temperature of the passenger compartment can be restricted from having rapid increasing.

The present invention is not limited to the embodiment. The embodiment may be variously changed within a scope of the present invention.

The air-conditioning device 1 is not limited to be used for cooling.

For example, two passages may be defined downstream of the evaporator 22 in the casing 31. A heater may be arranged in one of the passages so as to heat air cooled by the evaporator 22. A bypass passage may be defined by the other passage for bypassing the heater. In this case, the air-conditioning device 1 can heat air by controlling a ratio of air heated by the heater and air flowing through the bypass passage.

The vehicle having the air-conditioning device 1 is not limited to the gasoline engine vehicle. The air-conditioning device 1 may be used for a diesel engine vehicle or a hybrid vehicle.

The compressor 21 is not limited to the capacity-variable compressor. The compressor 21 may be a capacity-fixed compressor. In this case, the refrigerant discharge capacity is changed by changing operation ratio of the compressor 21. The operation ratio is changed by an electromagnetic clutch used for transmitting power from the engine to the compressor. That is, the electromagnetic clutch corresponds to the discharge capacity changing portion, in this case.

The refrigerant discharge capacity may be reduced by controlling the operation ratio of the compressor 21, at S9. Thus, the fuel consumption amount can be reduced to be equal to or lower than the upper limit Qm. The compressor 21 may be stopped by blocking the power transmission from the engine to the compressor.

When the actual fuel consumption amount of the engine 10 is determined to be equal to or lower than the upper limit Qm at S8, S10 is performed. Alternatively, at this time, the refrigerant discharge capacity of the compressor 21 may be raised.

Such changes and modifications are to be understood as being within the scope of the present invention as defined by the appended claims.

What is claimed is:

1. An air-conditioning device for a vehicle comprising:
a refrigerating cycle including
a compressor to compress and discharge refrigerant, the compressor being driven by an engine of the vehicle, and
an evaporator to evaporate refrigerant by exchanging heat with air to be sent for a passenger compartment of the vehicle;
a controller to control a refrigerant discharge capacity of the compressor in a manner that a refrigerant evaporation temperature of the evaporator approaches a target temperature;
an upper limit setting portion to set an upper limit for a fuel amount consumed by the engine based on at least the refrigerant evaporation temperature; and
a determining portion to determine whether an estmation value is larger than the upper limit, wherein,
the determining portion estamates the estimation value for the fuel amount consumed by the engine by subtracting a first fuel comsumption amount from a second fuel comsumption amount and then adding a fuel amount consumed for driving the vehicle,
the first fuel comsumption amount is defined when the compressor is stopped and the second fuel comsumption amount is defined when the compressor is active, and
the controller controls the refrigerant discharge capacity of the compressor in a manner that an actual fuel amount consumed by the engine is equal to or lower than the upper limit when the determining portion determines that the estimation value is larger than the upper limit.

2. The air-conditioning device according to claim 1, wherein
the upper limit setting portion increases the upper limit as a subtraction value is increased, and
the subtraction value is defined by subtracting the target temperature from the refrigerant evaporation temperature.

3. The air-conditioning device according to claim 2, wherein the upper limit setting portion increases the upper limit for the fuel amount consumed by the engine as the subtraction value is increased, by increasing the upper limit for a fuel amount consumed for driving the compressor.

4. The air-conditioning device according to claim 1, further comprising:
an upper limit correcting portion to correct the upper limit, wherein
the upper limit is increased as a load of the engine is increased.

5. The air-conditioning device according to claim 1, wherein the evaporator has a coolness storage portion to store cold energy.

6. The air-conditioning device according to claim 1, wherein
the upper limit setting portion calculates an upper limit for a fuel amount consumed for driving the compressor based on at least the refrigerant evaporation temperature, and
the upper limit setting portion sets the upper limit for the fuel amount consumed by the engine by adding the upper limit for the fuel amount consumed for driving the compressor to the fuel amount consumed for driving the vehicle.

* * * * *